United States Patent [19]

South

[11] 3,748,489
[45] July 24, 1973

[54] STATIC SYNCHRONIZER FOR ALTERNATING CURRENT GENERATORS

[75] Inventor: William H. South, McKeesport, Pa.
[73] Assignee: Westinghouse Electric Corporation, Pittsburgh, Pa.
[22] Filed: June 13, 1972
[21] Appl. No.: 262,435

[52] U.S. Cl.................... 307/87, 324/87, 307/133
[51] Int. Cl............................................... H02j 1/00
[58] Field of Search ................ 307/87, 85, 86, 139, 307/153, 133; 235/151 F; 324/87, 83

[56] References Cited
UNITED STATES PATENTS
3,069,555 12/1962 Kessler................................ 307/87
3,497,711 2/1970 Wuttig................................ 307/87

Primary Examiner—Herman J. Hohauser
Attorney—A. T. Stratton and Clement L. McHale

[57] ABSTRACT

A synchronizer for matching the voltage and frequency of a relatively lower rating alternating current generator to those of an alternating current bus or line to which the generator is to be connected. A circuit breaker is interposed between the generator and bus to complete the circuit between them upon command from the synchronizer. The voltage and frequency on both sides of the circuit breaker are sensed and supplied to the synchronizer circuit in signal form. The voltages and frequencies are then beat together and supplied to a switch means. If both of the composite voltage and frequency values are within acceptable limits for connecting the AC generator to the bus or line, sufficient electrical current is supplied to the switch means to overcome the bias supply and trigger the switch means to cause closing of the circuit breaker. A dead bus system is included which allows the closing of the circuit breaker if the bus is either dead or at a voltage significantly below the voltage of the alternating current generator when the generator is to be connected to the line. A seal-in circuit is also provided so that once the switch means has been actuated to close the circuit breaker, the circuit closing cycle will be completed even though the frequency and voltage of the previously mentioned alternating current generator and line begin to vary with respect to each other slightly. This is possible, if the alternating current generator is sufficiently low in volt-ampere rating to allow bringing the generator onto a slightly imperfectly matched bus or line without significant bump or system disturbance. The previously mentioned switch means is part of a controller circuit having the capability of sensing an unfiltered beat frequency signal and responding thereto.

24 Claims, 2 Drawing Figures

STATIC SYNCHRONIZER FOR ALTERNATING CURRENT GENERATORS

BACKGROUND OF THE INVENTION

This invention relates to an electrical synchronizer and it has particular relation to solid state or static electric synchronizers for use on relatively small alternating current generators.

In certain types of automatic synchronizing systems or automatic paralleling systems, such as the type disclosed in U.S. Pat. No. 3,069,555 solid state control circuitry is used in conjunction with a circuit breaker closing system for paralleling alternating current generators. However, a filtered beat frequency signal is required for operation. The beat frequency signal is supplied by monitors connected to the terminals of the generators to be paralleled. In some types of synchronizers, there are no seal-in or latch-in means so that once a signal has been initiated to start the closing of the circuit breaker such a signal can be inhibited from so doing before a complete circuit breaker closing operation has taken place. In the synchronizer disclosed in U.S. Pat. No. 3,213,362, no direct connection is made between the circuit breaker closing system and the phase or voltage detector system described therein. In neither of the previously mentioned patents are facilities or means provided to allow a generator to optionally close upon a dead bus. It would be advantageous therefore to provide a synchronizer system for use in controlling the connection of a relatively small alternating current generator to an alternating current electrical network or system through an interposed circuit breaker. It would be advantageous if the synchronizer system could be assembled from relatively inexpensive, readily available solid state devices, such as transistors and diodes, as well as from standard circuit components such as resistors, capacitors, transformers and relays. It would also be advantageous if an unfiltered beat frequency signal could be employed so that the relatively inaccurate averaging of a filtered beat frequency signal to determining the best time for closing could be avoided. Additionally, it would be advantageous to provide a synchronizer system capable of closing a circuit breaker between an alternating current generator and a dead bus or a bus that is substantially dead, for instance has no more than 10 volts on it in a normal 110 volt system. Finally, it would be advantageous to provide a seal-in means so that once the circuit breaker closing operation initiated by the associated synchronizer has begun, it will be carried to completion even though there is a relatively slight change in the relative frequencies and/or voltages of the generator and lines to be matched.

SUMMARY OF THE INVENTION

In accordance with the invention, an electrical system including a relatively low power alternating current (AC) generator, an alternating current bus or network and an interposed circuit breaker are monitored and controlled by a solid state or static synchronizer employing relatively inexpensive readily available solid state devices. One phase of the AC generator and one phase of the bus are monitored by potential transformers, the outputs of which are supplied to the primary windings of transformers in the synchronizer. The secondary windings of these transformers are connected together in such a manner that a beat frequency signal of the potential transformer signals is generated or produced. This signal is, in turn, supplied to a controller without prior electrical filtering. The controller includes an input switch means, a timer and a coil driver contained therein. The unfiltered beat frequency signal causes the switch means to turn on and off or cycle approximately 60 times a second each time starting the timer and stopping it. This mode of operation continues to occur until the value of the beat frequency signal is so low as to allow a direct current (DC) bias power supply to remove electrical current from a junction in the line carrying the unfiltered beat frequency signal. When this happens, the switch means remains off for a period of time sufficient to allow a capacitor in the timer to charge to a voltage value sufficient to actuate a relay driver to thereby energize a relay coil, the contacts of which are electrically connected to a portion of the closing circuit of the previously mentioned circuit breaker. Once the relay coil has been energized, a positive feedback signal is provided to a seal-in means which provides an alternate path for the previously mentioned beat frequency signal to a system common potential. Such being the case, even if the beat frequency signal increases in amplitude due to a disparity or change in either the frequency or voltage or both between the previously mentioned AC generator and the line, the switch means will not be reenergized to defeat the timer operation and the relay coil will remain energized and allow the entire closing cycle of the circuit interrupter to be completed before being deenergized automatically by the closing of the circuit breaker. This means that once the voltage and frequency of the two systems to be connected, namely the AC generator and the bus have reached a predetermined degree of similarity or closeness, even if for only an instant, the systems will be allowed to be electrically connected together some short time later and even if they have deviated from the previously mentioned state of similarity because it is known that predetermined deviations in frequency and/or voltage in a relatively small lower power system are not critical and no substantial damage will be done by allowing the generator to close on the bus. The current provided by the bias supply determines the level at which circuit breaker closing may be initiated. The bias supply is connected to the secondary of one of the previously mentioned input transformers. Connected to the secondary of the same transformers as the bias supply is a dead bus system which senses when the AC bus or line is at a very low value and provides an alternate signal to the previously mentioned relay coil driver. This relay coil driver is in the form of a transistor connected in series circuit relationship with a coil and power supply so that when the base of the transistor is sufficiently energized, the collector-emitter circuit of the transistor is closed and power may flow from the power supply to the coil. The base of this transistor is connected in this case in an OR mode, one of the OR inputs being connected as part of the controller circuit and the other of the OR inputs being connected to the dead bus system so that either the controller circuit or the dead bus system may energize the base of the transistor and cause the collector-to-emitter circuit of the transistor to saturate allowing current to flow through the coil to cause consequential closing of the circuit breaker or interrupter.

BRIEF DESCRIPTION OF THE DRAWINGS

For a better understanding of the invention reference may be had to the preferred embodiments exemplary of the invention shown in the accompanying drawings, in which.

DESCRIPTION OF THE PREFERRED EMBODIMENTS

Figure 1:
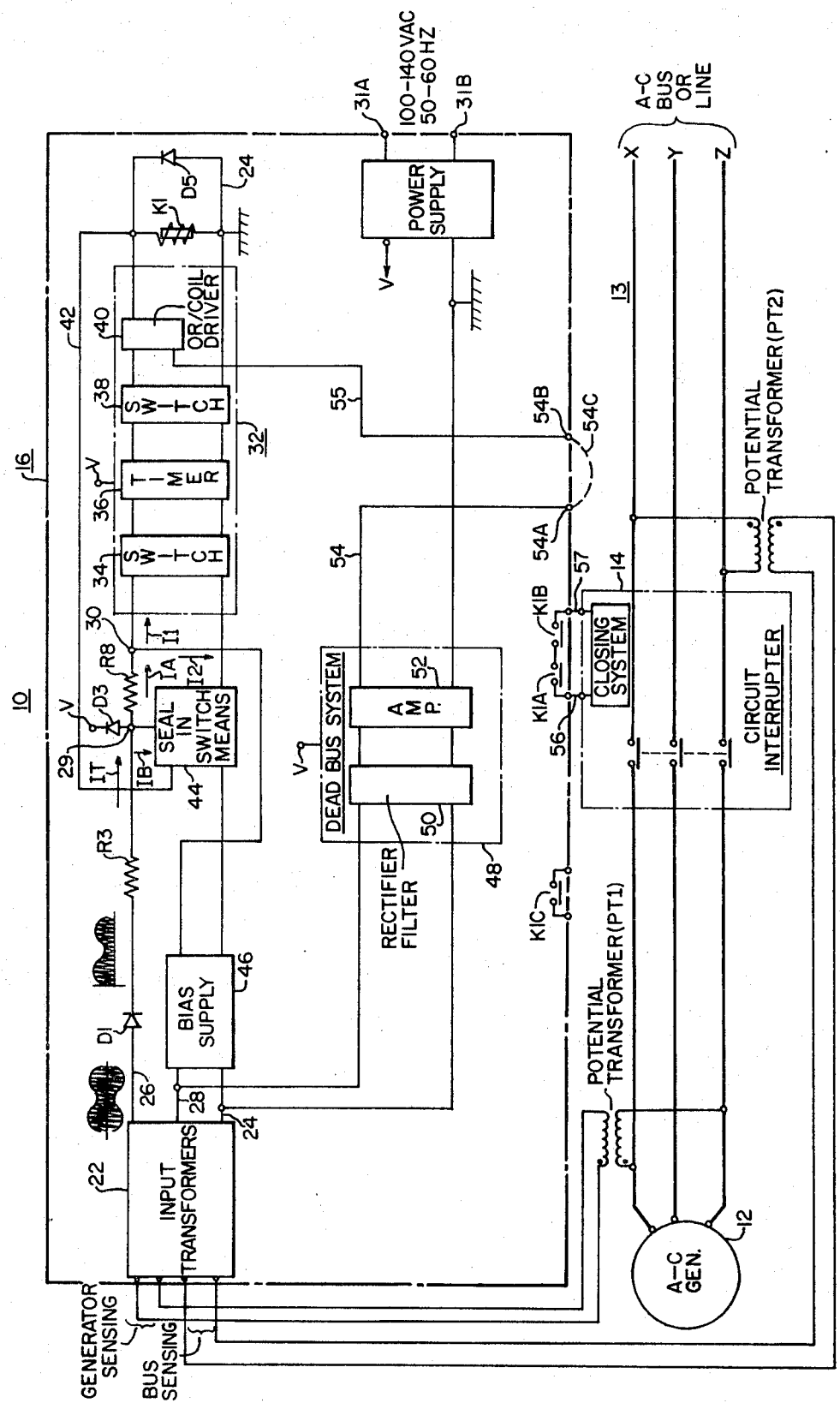
FIG. 1 is a functional block diagram of a synchronizer for a relatively low power alternating current generator and an alternating current bus to which it is to be connected by a suitable circuit breaker.

Referring now to the drawings and FIG. 1 in particular, an automatic synchronizer system 10 for connecting a relatively lower power alternating current (AC) generator 12 to an alternating current (AC) bus, line or network 13 through an interposed circuit breaker or interrupter 14 is shown. The synchronizer system 10 includes a solid state or static synchronizer 16. The circuit breaker 14 includes therein a closing system 18 which may be mechanical or electrical or any combination thereof and which may be actuated by a means such as the relay in synchronizer 16 to interconnect circuit breaker 12 with bus, network or line 13 which may be of the three phase type comprising three lines X, Y and Z. A potential transformer PT1 is connected across one phase of the alternating current generator 12, for example at conductors X and Z. A similar potential transformer PT2 is connected to the corresponding phase, that is to line conductors X and Z, in the AC bus 13, it being noted that the positive sides of both transformers may be connected to corresponding lines. The secondary of the potential transformer PT1 is connected to the synchronizer 16 at the generator sensing input terminals of the input transformer module 22. The secondary of potential transformer PT2 is connected to module 16 at the bus sensing input terminals of input transformer module 22. The input transformer module 22 may be of any convenient type but preferably is of the type employing two individual transformers rather than a single three-legged transformer. Input transformer module 22 has three output terminals connected to lines 24, 26 and 28. Line 24 may represent a system common potential bus or conductor for the synchronizer 16. Connected to line 26 is a diode D1 and a resistor R3 in series circuit relationship with the anode of the diode being connected to an output terminal of the input transformer module 22 at line 26 and the cathode being connected to one end of resistor R3, the other end of the resistor R3 being connected to a junction point 29. One end of a resistor R8 is also connected to junction point 29 as is the anode of a diode D3, the cathode of which is connected to the higher voltage terminal V of a power supply 31. The other end of resistor R8 is connected to a circuit junction point 30. Junction 30 is also connected by way of separate lines to a static controller 32 at a first input switch means 34. The signal may then move or pass from first input switch 34 to a timer 36 and from there to a second input switch means 38 and finally to one terminal or line 39 of a combination OR logic element — coil driver means 40. The output line of the combination OR gate — relay coil driver means 40 is connected to one side of a relay coil K1, the other side of which is connected to the system common bus 24. Connected to the same terminal on the relay coil K1 as the output terminals of the coil driver 40 is a conductor 42 which is also connected to the input terminal of a seal-in switch means 44. Another input terminal of the seal-in switch means 44 is connected by a suitable conductor to the previously mentioned junction point 29. A direct current bias power supply 46 is connected at one input terminal to the system common line 24 and at the other input terminal to the previously mentioned output line 28 of the input transformer module 22. Also connected to the bias power supply means 46 through a suitable electrical conductor is the previously mentioned junction 30. The system common conductor 24 is also connected to an output terminal on the bias supply means 46, and to terminals on the previously mentioned seal-in switch means 44, the first switch means 34, the timer circuit or means 36, the second switch means 38 and the third static switch means or combination OR gate — relay coil driver means 40. Electrically connected between the system common line 24 and the relatively high voltage side of the relay coil K1 is a diode D5, the anode of which is connected to the system common line 24 and the cathode of which is connected to the previously mentioned high voltage side of relay coil K1. Also connected across the input transformer output lines 24 and 28 are the input terminals for a dead bus system 48 which includes a rectifier-filter means 50 and an amplifier means 52. Output line 28 carries the signal which is supplied to the rectifier 50, the output of the rectifier 50 being supplied to amplifier 52. Amplifier 52 is connected by an electrical conductor 54 to a terminal 54A on the synchronizer module 16. A similar terminal 54B is located nearby and is connected to an electrically conducting line 55 which comprises another input to the previously mentioned OR gate 40, the line 39 being also an input line for OR gate 40 as previously mentioned. A jumper wire or electrical conductor 54C may be connected between the terminals 54A and 54B so that the output of amplifier 52 may be connected directly to the input lead 55 of the combination OR gate and relay coil driver 40.

Both the static controller 32 and the dead bus system 48 have terminals connected to the high voltage terminal V of previously mentioned power supply 31. Power supply means 31 has external input terminals 31A and 31B across or at which may be connected any convenient source of alternating or direct current which may be converted by power supply means 31 to provide a predetermined direct current voltage at the previously mentioned high voltage terminal V of power supply 31. For example, the voltage supplied to terminals 31A and 31B may range between 100 and 140 volts AC and be of a frequency between 50 and 60 hertz. Relay coil K1 may have three normally open and closeable contacts K1A, K1B, and K1C. Contacts K1A and K1B may be connected in series circuit relationship by means of conductors 56 and 57 between the synchronizer module 16 and the closing system or means 18 of the circuit breaker 14 so that contacts K1A and K1B are generally simultaneously closed when relay coil K1 is energized thus starting a closing cycle or operation for circuit breaker 14. Auxiliary relay contact K1C may be provided to initiate miscellaneous functions when coil K1 is energized.

OPERATION

Generally a synchronizer is not normally used for voltage sensing but is merely used for phase and/or frequency sensing. It should be remembered that frequency and phase are so dependent upon one another that an indication of the frequency may be converted to give an indication of the phase relationship and vice versa. However, a synchronizer 16 is adapted to be used for voltage sensing also. The type of input transformer system shown at 22 in module 16 comprises two independently wound transformers having independent or separate magnetic cores. A "three-legged" transformer, that is a transformer having a single secondary and plural primaries wound on the same magnetic core provides for summation of magnetic flux within the core of the transformer to form a magnetic beat frequency signal in the core of the three-legged transformer. This type of transformer is not used in the present invention because of the likely or probable occurrence of magnetic distortion or saturation in which harmonics of the input signals are formed by the distortion of the beat frequency in the saturated core thus forming a beat frequency signal which is not the true vector sum of the two electrical input signals as it should be. In the present invention, the separate transformers in input transformer module 22 need only produce about one-half the magnetic flux in a single core of each transformer than in a three-legged core, and thus each transformer core is less likely to saturate and consequently distort the input signals. The beat frequency is formed at the secondary windings of the transformers of the input transformer module 22 and is produced electrically rather than magnetically. In the present embodiment, the potential transformer PT2 provides a generally sinusoidal signal, substantially proportional in voltage to the phase voltage between conductors X and Z on the bus side of the circuit interrupter 14 and having substantially the same frequency as the frequency of the signal between conductor X and Z. Similarly, potential transformer PT1 provides a sinusoidal signal, substantially proportional to the frequency and the amplitude of the voltage between conductors X and Z on the generator side of circuit breaker 14. These signals are provided to input transformer module 22. At the output terminals or lines 24, 26 and 28 of the input transformer module 22 a composite beat frequency signal of the two signals from the potential transformers PT1 and PT2 is formed. This beat frequency signal comprises a carrier signal which has a frequency of approximately 60 hertz when the AC generator and bus frequencies are close to being matched in a 60 hertz system. Modulating this 60 hertz signal is an envelope signal representing the beat frequency signal of the AC generator 12 and the line or network 13. This signal gives an indication of the difference in voltage amplitudes and frequencies or slip between the voltages of the generator 12 and line 13. If the voltages of the system generator 12 and line 13 are perfectly matched, the envelope touches zero once every cycle of beat frequency signal. The frequency of the beat frequency signal is the difference between the frequency of the AC generator 12 and the line or network 13. Consequently, if the generator 12 differs in voltage amplitude and frequency from the AC network 13, the beat frequency signal will be at a frequency equal to the difference in frequencies of the electrical power in the two previously mentioned systems and the lowest part of the beat frequency signal will not be zero but will be some finite value. If the amplitudes of the voltages of alternating current generator 12 and AC bus or line 13 are matched, but the frequencies are not, the lowest part of the beat frequency signal will touch zero once per cycle of beat frequency signal but the beat frequency signal will vary at a frequency proportional to the difference between the frequency of the signal on AC generator 12 and the frequency of the signal on AC bus or line 13. If both the frequencies and voltages of the AC generator 12 and the bus or line 13 are substantially equal, there will be a beat frequency signal of zero amplitude.

Assuming there is a beat frequency signal representing a slight difference in voltages or frequencies or both between generator 12 and line 12, this signal is applied between system common conductor 24 and signal conductor 26 through diode D1 where it is half wave rectified to produce, for example, a positively going beat frequency signal superimposed on a carrier signal having a frequency of about 60 hertz. This signal which may be in the form of a current signal IT is applied to resistor R3. Current IT is then applied to junction 29 whereupon it may divide into two components of current namely IB and IA, with current IA flowing through resistor R8 to junction point 30. Flowing from junction 30 into bias supply means 46 is a direct current I2, whose value is a function of the components comprising power supply means 46 and the voltage between lines 28 and 29. A current I1 which is the instantaneous difference between the oscillating modulated carrier signal IA and the direct current I2 is supplied to module 32 and more specifically to switch 34 therein. Normally switch means 23 and 38 are energized and switch means 40 is deenergized. As long as current I1 is sufficiently higher at any instant of time than current I2, switch means 34 will not be energized. However, carrier signal I1 varies approximately 60 times per second and therefore 60 times per second current I2 will be larger than current I1 for a short period of time and for that short period of time switch means 34 is deenergized. When this happens, timer 36 is actuated to begin a timing cycle which could eventually deenergize second switch means 38 if left uninhibited. However, should current IA once again become quickly significantly larger than current I2, as is usually the case when the amplitude of the beat frequency signal is relatively large, carrier wave current I1 will increase each cycle to a value sufficient to energized switch 34. Consequently, timer 36 which has begun to time out will be inhibited from completing the timing cycle and the second switch means 38 which is normally in the energized state will not be given the opportunity to become deenergized.

This is the normal state of operation as long as no significant portion of the envelope or the modulated part of the carrier signal IA is less than the steady state DC signal value of current I2. However, as soon as the beat frequency signal decreases in amplitude to such a value that the lowest part of the rectified beat frequency signal IA is lower for a significant period of time than the steady state current I2, switch means 34 will be energized for a portion of time longer than one-sixtieth of a second or necessary portions thereof and the timer 36 will be allowed to continue its timing cycle for a longer period of time than previously described. Ultimately, a value of beat frequency signal amplitude of current IA may be reached where the lowest part of that signal envelope is less than current I2 for a period of time sufficient to allow timer 36 to actually complete its predetermined timing cycle and deenergize switch means 38. Such being the case, the combination OR gate — relay coil driver circuit 40 which is normally in the deenergized state is energized or actuated at input line 39 and electrical current is allowed to flow through coil K1 from power supply 31. When this happens, a voltage signal appears between lines 42 and system common line 24 which signal is provided to the input terminals of the seal-in switch means 44. This causes the seal-in switch means 44 to be actuated, to a state that allows the previously referred to component of current IB to flow from junction point 29 to system common 24. This component of current causes a further reduction in the value of current IA to a significantly lower value than it had been the instant before seal-in switch means 44 had been actuated, provided of course IA is not already zero in value. This means that even a greater portion of the portion of the modulated beat frequency signal referred to as I1 is less than current I2. Consequently, current IA must change to an even higher value to overcome the effect of the flow of current IB and to therefore provide a sufficient value of current I1 to switch means 34 to energize switch means 34 to, in turn, cause switch means 38 to be reenergized through timer 36. One measure of the usefulness of the seal-in switch means 44 lies in the fact that coil K1 is maintained in the energized state for much longer time than would normally be the case should the rise and fall of the modulated beat frequency signal to the only controlling factor in deciding whether coil K1 is energized or not. This provides the closing means or system 18 in circuit breaker 14 with sufficient time to complete an entire circuit breaker closing cycle to close the contacts 20 so that AC generator 12 may be connected to line 13. The closing system or means 18 may contain electrical and mechanical inertia which takes a finite time to overcome before contacts 20 are closed and that is one reason why the seal-in or latch-in feature is important. Of course, once the contacts 20 are closed, the voltage and frequency of both the AC generator and the bus or line 13 are generally equal, and, as was previously described the value of the beat frequency signal will fall to zero so that thereafter IA cannot be larger than the steady state value of I2 for that particular closing operation. By choosing suitable component values for the elements in the bias supply 46, the predetermined value of I2 can be raised or lowered thus changing the predetermined value of the beat frequency signal at which coil K1 may be energized and circuit breaker 14 subsequently closed. The signal voltage between system common line 24 and output line 28 of input transformer module 22 is provided to a dead bus system 48 in which it is rectified and filtered, unlike its companion signal on line 26, by the rectifier filter means 50. This signal is then provided to an amplifier 52 and thence through jumper conductor 54C to the alternate base or input lead 55 of the combination OR gate and relay coil driver 40. If the voltage between conductors X and Z for example on the bus side is below a specific predetermined value in amplitude at which closing of the generator 12 onto the line 13 is desired this will be reflected through potential transformer PT2 and through one portion of the input transformer module 22 to the lines 24 and 28. If the value is low as determined by the elements in rectifier-filter circuit 50 and amplifier 52, the value of the signal on line 55 wil cause dead bus circuit 48 to energize coil K1 in a manner similar to that previously described with respect to the energizing signal being applied to line 39. This provides an alternate means for actuating the connection of the AC generator 12 with the AC bus line or network 13 through the contacts 20 of the circuit breaker 14. The alternate method is useful for example when there is no or very little voltage on the AC network 13. As can be expected, it is relatively easy therefore to connect an AC generator system having a specific voltage and frequency with a network having no or little voltage present thereon.

Figure 2:
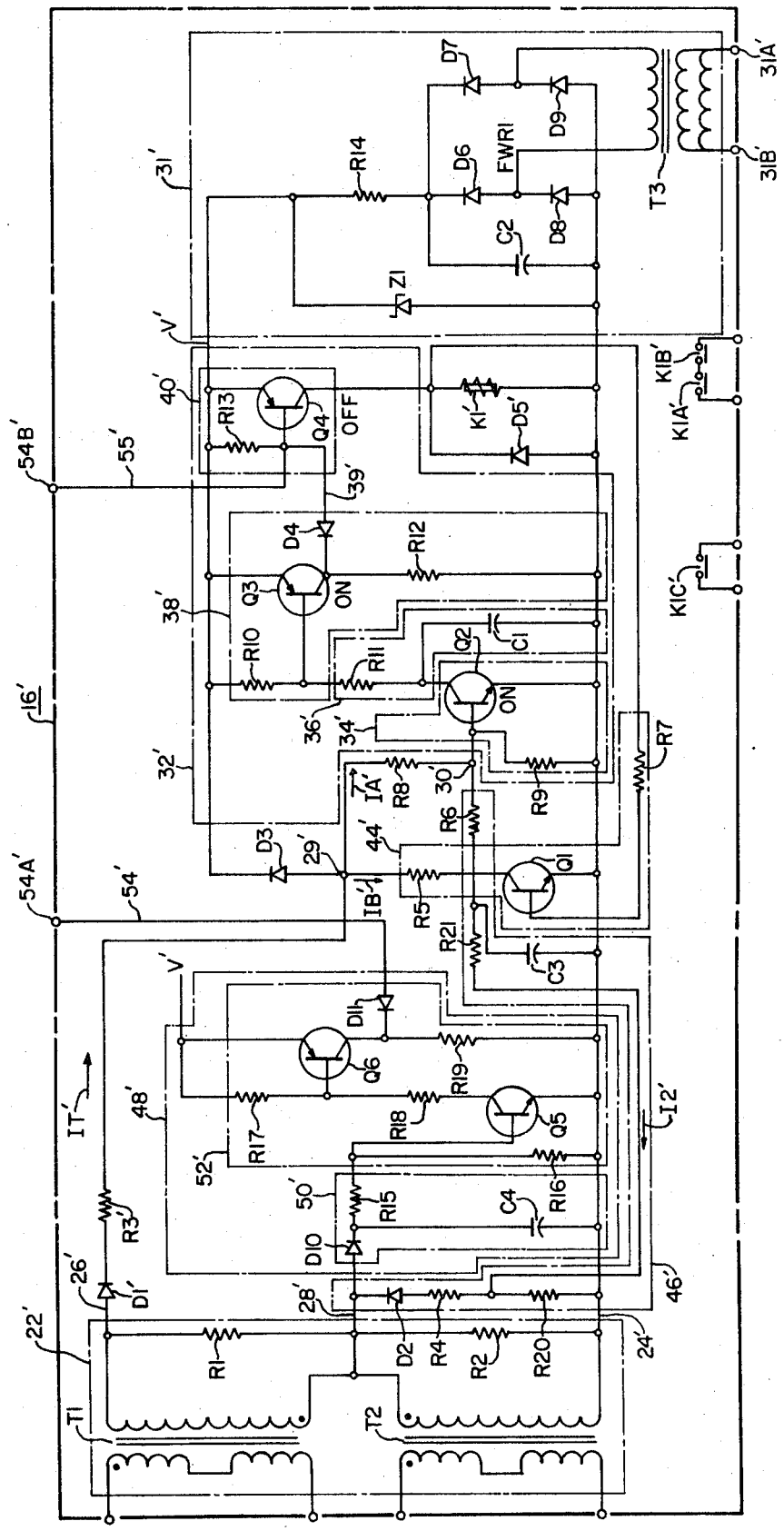
FIG. 2 is a schematic diagram of one embodiment of the synchronizer of FIG. 1.

Referring now to FIG. 2 an embodiment 16' of the synchronizer 16 of FIG. 1 is shown. Although the alternating current generator 12, the circuit breaker 14, the alternating current bus or network 13 and the potential transformers PT1 and PT2 of FIG. 1 are not shown in FIG. 2, it should be understood that these elements are of the type which are most conveniently controlled by the circuitry shown in synchronizer 16' and may be considered as being included in FIG. 2 for the purpose of explanation. Synchronizer 16' includes an input transformer means or module 22' similar to module 22 shown in FIG. 1. Included in module 22' are two transformers T1 and T2 having separate primary windings, secondary windings and magnetic cores. The primary windings of transformers T1 and T2 may be connected to potential transformers PT1 and PT2, respectively such as shown in FIG. 1. The input signal to transformer T1 may represent the voltage and frequency of one phase of an alternating current generator. Correspondingly, the input signal to transformer T2 may represent the voltage and frequency of one phase of preferably an alternating current bus, line or network. The secondary windings of transformers T1 and T2 are electrically connected in series circuit relationship so that the input signals on the primaries of transformers T1 and T2 may be beat together to form a beat frequency, modulated carrier signal where the carrier wave oscillates at approximately 60 hertz or the frequency of the bus, and the beat frequency modulating envelope oscillates at substantially the difference between the frequency of the signal being applied to the primary of transformer T1 and the frequency of the signal being applied to the primary of transformer T2. (Known as slip frequency). Resistors R1 and R2 are shown connected in parallel circuit relationship across the secondary windings of transformers T1 and T2, respectively, for the purpose of transformer load matching and ballast. Input transformer module 22' has three terminals or output leads connected thereto namely system common lead 24', beat frequency signal lead 26' and secondary lead 28' for transformer T2. The signal between leads 24' and 26' comprises the composite vectorially added secondary signals of transformers T1 and T2 and may be generally referred to as the beat frequency modulated carrier signal. The signal between lines or terminals 24' and 28' may in some instances be a reduced form of the previously described signal or it may otherwise be referred to as the output signal of the secondary of transformer T2. Lead 26' is connected to the anode of a diode D1' the cathode of which is connected to one side of a resistor R3'. The other side of resistor R3' is connected to a circuit junction point 29'.

Also connected to junction 29' is the anode side of a diode D3', the cathode of which is connected to voltage source 31', at terminal V'. Also connected to junction point 29' are one terminal of a seal-in module 44' and one end of a resistor R8'. The other side of the resistor R8' is connected to a junction point 30'. Also connected to junction point 30' is one terminal of a direct current (DC) bias supply means 46' and one terminal of a switch or switch means 34' in a static controller means 32'. Specifically, the base of an NPN transistor Q2 of switch means 34' is connected to junction point 30'. Transistor Q2 is an element in the switch means 34'. Also included therein is a resistor R9 connected between the base and emitter of transistor Q2, both of which are also connected to system common line 24'. The collector of transformer Q2 is connected to a timing element or means 36', specifically to the junction point between a capacitor C1 and a resistor R11 connected in series circuit relationship in the timing element 36'. The other side of capacitor C1 is connected to system common lead 24' so that capacitor C1 is connected across the collector and emitter of transistor Q2. Resistor R11 is connected at its other end to a second switch means 38'. Specifically, it is connected to one end of a resistor or resistive element R10 and to the base terminal of a PNP transistor Q3. The other end of resistor R10 is connected to voltage terminal V' of power supply means 31'. The emitter of transistor Q3 is also connected to this voltage terminal. The collector of transistor Q3 is connected concurrently to the cathode of a diode D4 and to one end of a resistor R12, the other end of which is connected to the system common line or lead 24'. The anode of diode D4 is connected to a combination OR gate and relay coil driver 40', more specifically, to one end of a resistor R13 and to the base of a transistor Q4, the emitter of which along with the other end of resistor R13 is connected to the terminal of power supply means 31 at voltage terminal V'. The collector of transistor Q4 is connected to the cathode of the diode D5' and also to one side of a relay coil K1'. It is also connected to another terminal of the previously mentioned seal-in module 44'. The anode of diode D5' and the other end of relay coil K1' are connected to the system common terminal or line 24' which is also connected to the other terminal (not V') of the power supply means 31'.

Seal-in means 44', which was previously mentioned comprises an NPN transistor Q1, the emitter of which is connected to the system common line or terminal 24' and the collector of which is connected to one end of a resistor R5. The other end of resistor R5 is connected to the previously described junction point 29'. The base of transistor Q1 is connected to one end of a resistor R7, the other end of which is connected to the previously described collector of transistor Q4. Across the output lines or terminals 28' and 24' of transformer means 22' are connected the input terminals of the previously described bias supply means 46' and the seal-in circuit 48'. Both of these modules are connected in parallel circuit relationship with respect to each other and the aforementioned terminals or lines 24' and 28'.

Specifically, bias supply means 28' comprises a diode D2 having its cathode connected to line or lead 28'. The anode of diode D2 is connected to a resistor R4, the other end of which is connected to one end of another resistor R20. The other end of resistor R20 is connected to the system common terminal or lead 24'. Connected to the junction between resistors R4 and R20 is one end of a resistor R21, the other end of which is connected jointly to one end of a resistor R6 and one end of a capacitor C3, the other end of which is connected to common line or lead 24'. The other end of resistor R6 is connected to the previously described junction pont 30'. One of the component elements of the previously described seal-in circuit 48' is a combination half wave rectifier-filter circuit 50' which comprises a diode D10, the anode of which is connected to terminal or lead 28' and the cathode of which is connected to one end of a resistor R15 and jointly to one end of a capacitor C4, the other end of which is connected to the system common line 24'.

The other end of resistor R15 is connected concurrently to one end of the resistor R16 and the base of an NPN transistor Q5 which forms part of an amplifier circuit 52'. The other end of resistor R16 and the emitter of transistor Q5 are both connected to the system common terminal 24'. The collector of transistor Q5 is connected to one end of resistor R18, the other end of which is connected jointly to one end of a resistor R17 and to the base of a PNP transistor Q6. The emitter of transistor Q6 and the other end of resistor R17 are connected to the terminal V' on power supply 31'. The collector of transistor Q6 is connected jointly to one end of a resistor R19 and to the cathode of a diode D11. The other end of resistor R19 is connected to the previously described system common or ground terminal 24'. The anode of diode D11 may be connected to an output terminal 54A' on module or synchronizer 16' by means of lead or line 54'. There is an associated terminal 54B' mounted adjacent to terminal 54A' on module 16' to which is connected a lead or line 55', which lead terminates at the base of the previously described transistor Q4.

Power supply means 31' may be of any appropriate type but in one embodiment of the invention comprises an input transformer T3 which may have primary windings connected in parallel circuit relationship to the terminals 31A' and 31B'. The secondary of transformer T3 is connected to the input terminals of a full wave rectifier circuit FWR1 comprising diodes D6, D7, D8 and D9 connected in a standard full wave bridge rectifier arrangement. Connected across the output terminals of rectifier FWR1 is a filter capacitor C2. Connected to the higher absolute value voltage side of the rectifier FWR1 is one end of a resistor R14, the other end of which is connected jointly to the regulating cathode of a Zener diode Z1 and to the output terminal V' of power supply.

The other side or terminal of full wave rectifier FWR1 is connected to the anode of the previously mentioned Zener diode Z1 and to the system common lead 24'. Relay coil K1 may form part of a relay system or means comprising, for example, three sets of contacts K1A', K1B' and K1C' where, for example, K1A' and K1B' may be connected in series circuit relationship with a closing circuit or means such as 18 shown at FIG. 1 and where contact K1C' may be used as an auxiliary set of contacts.

OPERATION OF SYNCHRONIZER 16'

In operation, input signals may be applied to the primary windings of the previously described transformers T1 and T2. Preferably, the signal from one phase of the generator side of the circuit breaker is applied to the primary winding of transformer T1 and the signal from a corresponding phase of the line side of the circuit breaker is applied to the primary winding of transformer T2, where the circuit breaker in question may be similar to circuit breaker 14 shown in FIG. 1. These signals, as applied, may comprise approximately 60 hertz sinusoidally shaped current of voltage waves. Since the secondary winding of transformers T1 and T2 are electrically connected, the two previously mentioned signals are beat together or vectorially added to form a composite signal having a carrier frequency of approximately 60 cycles per second when the frequency of the alternating current generator is close to the frequency of the alternating current bus or line or network (which ideally for example, is 60 hertz). The amplitude of the previously described carrier signal varies as a function of the voltage and frequency differences between the alternating current generator and the AC bus or line. This beat frequency signal, as it may be referred to, comprises an envelope upon the carrier signal previously described. The beat frequency signal is impressed across terminals 24' and 26' and is rectified by diode D1' to form a half wave rectified signal IT' which flows through resistor R3. This current flows into terminal 29' whereupon, in normal operation, without relay coil K1' being energized, it continues to flow substantially unchanged as signal IA' through resistor R8 to a junction 30' or base of transistor Q2. Transistor Q2 is normally in the "ON" state provided the instantaneous value of the current signal IA' is significantly larger than the value of the bias signal I2' which flows out of the base of transistor Q2. Such being the case, capacitor C1 is shunted or rendered inactive by the virtual low resistance path from the collector to emitter of transistor Q2. At the same time, transistor Q3 is retained in the ON state by the flow of a significantly large amount of base current from the base of transistor Q3. This current is provided from terminal V' through the emitter of transistor Q3 out of the base terminal, through resistor R11 and through the collector-to-emitter of the "ON" or energized transistor Q2 and returned to the other end or other side of power supply 31 (not terminal V'). Since transistor Q3 represents, under the previously described condition a low impedance path from its collector to its emitter, the cathode of diode D4 is a virtually connected through the collector circuit of Q3 to the power supply terminal V' and is therefore reverse biased. Assuming that no current signal is allowed to flow in line 55, transistor Q4 may then be thought of as being in the "OFF" or deenergized state. Resistors R9, R10 and R13 represent base to emitter resistors for transistors Q2, Q3 and Q4, respectively. Since transistor Q4 is in the deenergized or "OFF" state, no current may flow from voltage source V' to common terminal 24' and, consequently, the relay contacts K1A', K1B' and K1C' are open or not actuated. Current I2' which may represent a steady state direct current flowing away from the base of transistor Q2 is limited substantially by resistors R21 and R6 which also form part of a filtering network comprising resistors R21 and R6 and capacitor C3. The current I2' derives its value from the voltage divider comprising the resistors R4 and R20 and the half wave rectifier or diode D2 which is so connected in this embodiment as to provide only a negative value of voltage to the junction between the resistors R4 and R20 so that current I2 may flow in the direction shown in FIG. 2.

The rectifier-voltage divider combination derives its power from the secondary of transformer T2 and/or the secondary of transformer T1. A dead bus capability exists within synchronizer module 16'. If the voltage at the secondary of transformer T2 drops appreciably, the positively rectified current coming out of rectifier-filter means 50' drops to a level sufficient to deenergize or turn off transistor Q5. That being the case, transistor Q6 is also deenergized or turned off and, assuming terminals 54A' and 54B' have been interconnected, base current may then be caused to flow in transistor Q4 because the reverse bias on diode D11 is removed by the action of deenergizing transistor Q6 and thus removing the cathode of diode D11 from the voltage source V'. Such being the case, the base current from transistor Q4 may flow through the forward biased diode D11 and through resistor R19 to the return terminal of power supply 31' or system common 24'. The flow of current out of the base of transistor Q4 energizes or turns transistor Q4 "ON" because transistor Q4 can be energized to turn on by the flow of base current out of transistor Q4 into either of the two leads namely 39' or 55'. In the present application, current flows through lead 55'. Leads 39' and 55' combine to form an OR function such that transistor Q4 may be energized or turned on if current is allowed to flow out of the base of transistor Q4 into either lead 55' or lead 39'. If transistor Q4 is turned on by the action of the dead bus circuit, as previously mentioned, which can only occur if the voltage on an alternating current bus line or network such as 13, shown in FIG. 1 is lowered to a predetermined level, then the relay coil K1 may be energized causing relay contacts K1A' and K1B' to close. In the latter case, the closing system for the interposed circuit breaker 14 may be energized or a closing cycle may be begun so that contacts 20 may be caused to close thus interconnecting an AC generator such as 12 with an alternating current bus, line or network such as 13 as shown in FIG. 1.

Since it is advantageous once the closing cycle has begun to allow it to continue to its completion, a latching or seal-in network or means 44' is provided whereby the voltage impressed across energized relay coil K1 is reflected as current through resistor R7 to the base of the transistor Q1 where it energizes or turns on transistor Q1 allowing a significant amount of current to flow from junction 29' through resistor R5 and the saturated or "ON" collector-to-emitter circuit of transistor Q1. This current, known as IB', is a portion of signal IT' and reduces the amount of current IA' which is provided to the junction 30', which is also the base of transistor Q2. As will be seen later, the reduction of current IA' provides an alternate way for keeping transistor Q4 energized by allowing current to flow from the base of transistor Q4 through the alternate OR gate represented by lead 39'. Regardless of whether current IA' is caused to be reduced due to the flow of a significant amount of seal in current IB' or merely because the beat frequency signal impressed between leads 24' or 26' is sufficiently low to reduce current signal IT' and therefore reduce current IA', transistor Q2 is deenergized or turned off. In normal operation, transistor Q2 is deenergized or turned off once per cycle of carrier signal comprising the current signal IT'. This generally occurs 60 times a second and it occurs when the carrier signal IA' drops below the level of current I2' which, as was previously mentioned in the bias current signal which determines the predetermined value at which transistor Q2 will be deenergized or turned "OFF" and at which value relay coil K1 may be subsequently energized. When transistor Q2 is turned off once per cycle of beat frequency signal, capacitor C1 is no longer shunted by the relatively low impedance of a saturated or turned on transistor and base current flows from base of the on transistor Q3 through the resistor R11 and into one side of capacitor C1 which then charges. As capacitor C1 charges, the current flowing from the base of resistor Q3 through resistor R11 decreases, thus tending to turn transistor Q3 off. In normal operation, the application of the next cycle of carrier signal quickly turns transistor Q2 on again thus providing a shunt path for the accumulated electric charge in capacitor C1 and allows the base current in transistor Q3 and resistor R11 to increase rapidly through the virtual low resistance path of the conducting collector-to-emitter path of transistor Q2. Consequently, the timing cycle operation employing the use of resistor R11 and capacitor C1 is actuated once per cycle of carriers of beat frequency signal which is generally 60 times a second. Transistor Q3 will not turn off regardless of the state of transistor Q2 unless the timing cycle is allowed to complete itself. This usually takes significantly longer than the time provided by one cycle of carrier signal for the beat frequency signal IT. However, in the event that the beat frequency signal for carrier signal IT' falls significantly below the value of steady state current I2', transistor Q2 will remain off for longer than one cycle of carrier signal and capacitor C1 will be allowed to charge for a longer period of time thus eventually leading to the turning off of transistor Q3. When transistor Q3 turns off, the reverse biased diode D4 is then forward biased and current is allowed to flow from the base of transistor Q4 through the forward biased diode D4 and resistor R12 to the system common terminal 24' whereby, in a manner previously described, transistor Q4 is energized and relay coil K1 is energized and the seal-in circuit 44' is actuated to provide a relatively longer time for accomplishing the closing of a circuit breaker the closing system or circuit of which may be connected to the relay contacts K1A', K1B', K1C'. Once the seal-in circuit 44' has been actuated, the value of the amplitude of the envelope of the beat frequency signal modulating the previously mentioned carrier signal must increase to a sufficiently larger amount than was required to deenergize transistor Q2. This is because when transistor Q2 was initially deenergized, no component of current IB' was flowing and essentially IA equaled IT'. However, after deenergization of transistor Q2 and the actuation or energization of the seal-in circuit 44', the current IT' was separated into two components IA' and IB', the component IA' being significantly less than it was previously for the same value of beat frequency signal IT' because current component IB' is now allowed to flow. Consequently, in order for an amount of current IA' sufficient to once again energize transistor Q2 to flow, beat frequency signal IT' must be raised to a much larger value than was necessary to turn off transistor Q2'.

It is to be understood that the power supply means 31' shown in FIG. 2 may comprise any suitable source of alternating power for the synchronizer module 16'. Typically it is envisioned that alternating current at 50 to 60 hertz and 100 to 140 volts is supplied to terminal 31B' and 31A' to energize power supply 31'. Typically, the voltage across terminals V' and 24' is 24 volts DC but it is to be understood that this may be any suitable value for energizing the various transistors, relays and diodes in the synchronizer 16'. It is also to be understood that although various kinds of NPN and PNP transistors are employed throughout the circuitry in the synchronizer module 16', other types of transistors, including the substitution of PNP transistors for NPN transistors and vice versa, may be used. Also field effect transistors may be used and in some instances, if desired, the entire circuitry shown as circuit module 16' with the exception of the relay coil K1 may be formed on one chip of an integrated circuit of appropriate material or may be formed from various combinations of integrated circuits. It is also to be understood that those elements previously described as resistors may be any kind of resistive elements and these elements defined as capacitors may be any kind of capacitive elements. It is also to be understood that the seal-in circuit 44' and the dead bus circuit 48' need not be employed at all or in combination for the basic operation of synchronizer 16'. In other instances, the bias supply system 28' may be replaced by a suitable known bias supply system of another type. In addition to the electronic combination of the various circuit elements in the synchronizer module 16' the various modules such as 28', 48' and 44' which represent the bias supply means, the dead bus means and the seal-in means, respectively, may also be combined to form an operative synchronizer. It is also to be understood that the circuit "bump" previously described may be referred to any appropriate circuit disturbance.

The apparatus embodying the teachings of this invention has several advantages. For example, since the beat frequency signal IT' need not be filtered, certain filtering elements may be omitted from the synchronizer system, and, in addition, the fact that this signal is not filtered allows for tighter or more accurate control of the value of the beat frequency signal at which the synchronizer circuit will cause energization of the relay coil and subsequent synchronization of an AC generator with an AC bus or line. Another advantage lies in the fact that each seal-in network may be so constructed that once initiation of a closing cycle of a circuit interrupter or circuit breaker has begun, the cycle will not be aborted or prevented due to slight variations in the value of the beat frequency signal nor to slight changes in the frequencies and voltages of the corresponding AC generator and network. It is to be recognized that because of the relatively lower power values of alternating current generators to which the invention is particularly adapted, it is much less significant or necessary to close the circuit breaker at exactly 12 O'-clock on the synchroscope, because the bump or disturbance in a system of this relative magnitude is relatively insignificant near the synchronization voltage and frequency. Another advantage lies in the fact that the dead bus circuit allows for the easy and convenient closing of an AC generator on a dead or near dead bus without the use of a separate sensing means for the dead bus and separate control means aside from those described and available in the synchronization module 16'. This function may be optionally inhibited merely by disconnecting a lead from easily accessible output terminals 54A' and 54B'. Another advantage lies in the fact that relatively small solid state components may be used for the synchronizer and in addition relatively standard static components such as bipolar transistors, Zener diodes and regular diodes are all that are required for the synchronizer module 16'. Still another advantage lies in the fact that a three-legged transformer which may introduce distortion into the beat frequency signal is not employed in the preferred embodiments of the present application.

I claim as my invention:

1. An automatic synchronizer of the type adapted to control an electric circuit interrupter which is used to connect an alternating current electrical generator with an electric network, comprising:

a first means for sensing the frequency and voltage amplitude in at least one phase of said alternating current electrical generator and for providing an output signal proportional thereto, a second means for sensing the frequency and voltage amplitude in at least one phase of said electrical network and for providing an output signal proportional thereto, input transformer means connected to both said first and second sensing means for the purpose of vectorially adding said previously mentioned output signals to produce an unfiltered carrier signal which is modulated at the beat frequency of both said previously mentioned output signals to produce a beat frequency signal which is related to the differences in frequencies and voltage amplitudes of the previously mentioned signals, said previously mentioned beat frequency modulated carrier signal being produced at a first pair of output terminals on said input transformer means, said input transformer means including a transformer having a primary winding and a secondary winding and a second pair of output terminals which are connected across the secondary winding of said transformer of said input transformer means, the primary winding of said transformer being connected to said second sensing means, a static controller means including first static switch means having a control terminal and output terminals, and a static relay coil driver means which also has input terminals connected to said first static switch means and output terminals, said static controller being electrically connected in circuit relationship with said input transformer means to receive at least a portion of said beat frequency signal as an input signal at said control terminal of said first static switch means and to provide an output signal at said output terminals of said static relay coil driver means which is capable of energizing a relay means when said at least a portion of said beat frequency signal reaches a predetermined level of amplitude, a relay means having contacts and a relay coil, said contacts being actuated to a predetermined state when said relay coil is energized by said previously mentioned output signal being applied to said relay means, said relay means having at least two output terminals one of which has a higher absolute value of voltage present thereon than the other when said relay coil is energized, a circuit interrupter with closing means and movable contacts, said circuit interrupter closing means being connected in circuit relationship to said previously mentioned relay contacts whereby said circuit interrupter closing means is energized to actuate said circuit interrupter to a state to effect the circuit relationship or said generator and said network with respect to each other when said relay contacts are actuated; and a power supply means to energize said automatic synchronizer having one terminal thereon at a voltage value of generally relatively higher average absolute value than another terminal thereon.

2. The combination as claimed in claim 1, wherein a seal-in means having at least two terminals is provided, one of said terminals of said seal-in means being connected to said terminal on said relay means having said higher absolute value of voltage present thereon when said relay coil is energized and the other terminal of said seal-in means being connected in current relationship with said control terminal of said first static switch means of said static controller means, said seal-in means responding to the application of said output signal to said relay means for temporarily changing said portion of said beat frequency signal supplied to said static controller means to thereby delay deenergization of said relay coil after said relay means is energized for the purpose of actuating said circuit interrupter to cause connection of said generator means to said electric network, whereby said relay coil will remain energized until said voltage and frequency of said at least one phase of said generator is substantially equal to said voltage and frequency of said at least one corresponding phase of said electric network and said connection will be made with a minimum internal readjustment of the voltage and frequency values between said generator and said electric network.

3. The combination as claimed in claim 2, wherein a dead bus actuator means is connected in circuit relationship across said pair of output terminals of said input transformer means and includes an output terminal which is connected to said static relay coil driver means of said static controller means, said dead bus actuator being capable of providing a signal to said static relay coil driver means for the purpose of energizing said relay coil when said signal from said second means for sensing the frequency and voltage amplitude of said at least one phase of said electrical network indicates the absolute value of said voltage of said phase is below a predetermined value.

4. The combination as claimed in claim 3, whereby said static controller means includes a timer means which is connected in circuit relationship with said first static switch means and said relay coil driver means, said timer means being actuated by said first static switch means once per cycle of said carrier signal but only providing a signal to actuate said static relay coil driver means when said portion of said carrier modulating beat frequency signal reaches said predetermined level of amplitude and remains so for a predetermined time.

5. The combination as claimed in claim 4, wherein a bias power supply means is connected in circuit relationship across said pair of output terminals of said input transformer means and includes an output terminal which is connected to said control terminal of said static switch means of said static controller means for providing a bias signal for said control terminal of said static switch means to thereby provide said predetermined level of amplitude for said beat frequency signal.

6. The combination as claimed in claim 2, wherein said bias power supply means is connected in circuit relationship across said pair of output terminals on said input transformer means and includes an output terminal which is connected to said control terminal of said static switch means of said static controller means for providing a bias signal for said control terminal of said static switch means to thereby provide said predetermined level of amplitude for said beat frequency signal.

7. The combination as claimed in claim 2 wherein said static controller means includes a timer means which is connected in circuit relationship with said first static switch means and said relay coil driver means, said timer means being actuated by said first static switch means once per cycle of said carrier signal but only providing a signal to actuate said static relay coil driver means when said portion of said carrier modulating beat frequency signal reaches said predetermined level of amplitude and remains so for a predetermined time.

8. The combination as claimed in claim 7, wherein a bias power supply means is connected in circuit relationship across said pair of output terminals of said input transformer means and includes an output terminal which is connected to said control terminal of said static switch means of said static controller means for providing a bias signal for said control terminal of said static switch means to thereby provide said predetermined level of amplitude for said beat frequency signal.

9. The combination as claimed in claim 3, wherein a bias power supply means is connected in circuit relationship across said pair of output terminals of said input transformer means and includes an output terminal which is connected to said control terminal of said static switch means of said static controller means for providing a bias signal for said control terminal of said static switch means to thereby provide said predetermined level of amplitude for said beat frequency signal.

10. The combination as claimed in claim 1, wherein a dead bus actuator means is connected in circuit relationship across said pair of output terminals of said input transformer means and includes an output terminal thereon which is connected to said static relay coil driver means of said static controller means, said dead bus actuator being capable of providing a signal to said static relay coil driver means for energizing said relay coil when said signal from said second means for sensing the frequency and voltage amplitude of said at least one phase of said electrical network indicates the absolute value of said voltage of said phase is below a predetermined value.

11. The combination as claimed in claim 10 wherein said static controller means includes a timer means which is connected in circuit relationship with said first static switch means and said relay coil driver means, said timer means being actuated by said first static switch means once per cycle of said carrier signal but only providing a signal to actuate said static relay coil driver means when said portion of said carrier modulating beat frequency signal reaches said predetermined level of amplitude and remains at that level for a predetermined time.

12. The combination claimed in claim 11, wherein bias power supply means is connected in circuit relationship across said pair of output terminals of said input transformer means and includes an output terminal which is connected to said control terminal of said static switch means of said static controller means for providing a bias signal for said control terminal of said static switch means to thereby provide said predetermined level of amplitude for said beat frequency signal.

13. The combination as claimed in claim 10, wherein a bias power supply means is connected in circuit relationship across said pair of output terminals of said input transformer means and includes having an output terminal which is connected to said control terminal of said static switch means of said static controller means for providing a bias signal for said control terminal of said static switch means to thereby provide said predetermined level of amplitude for said beat frequency signal.

14. The combination as claimed in claim 1 wherein said static controller means includes a timer means which is connected in circuit relationship with said first static switch means and said relay coil driver means, said timer means being actuated by said first static switch means once per cycle of said carrier signal but only providing a signal to actuate said static relay coil driver means if said portion of said carrier modulating beat frequency signal has passed through said predetermined level of amplitude and remained therepast for a predetermined time.

15. The combination as claimed in claim 14, wherein a bias power supply means is connected in circuit relationship across a said pair of output terminals on said input transformer means, having an output terminal thereon which is connected to said control terminal of said static switch means of said static controller means for the purpose of providing a bias signal for said control terminal of said static switch means to thereby provide said predetermined level of amplitude for said beat frequency signal.

16. The combination as claimed in claim 1, wherein a bias power supply means is connected in circuit relationship across a said pair of output terminals on said input transformer means, having an output terminal thereon which is connected to said control terminal of said static switch means of said static controller means for the purpose of providing a bias signal for said control terminal of said static switch means to thereby provide said predetermined level of amplitude for said beat frequency signal.

17. The combination as claimed in claim 1, wherein a seal-in means having at least two terminals is provided, one said terminal being connected to said terminal on said relay means having said higher absolute value of voltage present thereon when said relay coil is energized and the other terminal being connected in circuit relationship with said control terminal of said static switch means of said static controller means, said seal in means responding to the application of said output signal to said relay means for the purpose of temporarily changing said predetermined level of amplitude at which said beat frequency signal will cause energization of said relay means to thereby delay deenergization of said relay coil so that after said relay means is actuated for the purpose of actuating said circuit interrupter to cause connection of said generator means to said electric network, said relay coil will thereby remain energized until said voltage and frequency of said at least one phase of said generator is substantially equal to said voltage and frequency of said at least one corresponding phase of said electric network so that said connection will be made with a minimum internal readjustment of the respective voltage and frequency values of said generator and electric network.

18. The combination as claimed in claim 1 wherein, said static controller means includes a timer means comprising a capacitive element connected in series circuit relationship with a resistive element and in parallel circuit relationship with said output terminals of said first static switch means of said static controller means, said series combination of said capacitive and resistive elements being connected at one end thereof to the control terminal of a second static switch means, one output terminal of which is connected to the control terminal of a third static switch relay coil driver means and the other output terminal of which is connected to said terminal of higher average absolute value of voltage of said power supply means, said third static switch means having an output terminal connected to said relay means and another output terminal connected to one said terminal on said power supply means and allowing electrical energy to flow through said relay means from said power supply means only when said control terminal of said third static switch means is substantially not connected to said terminal of higher average absolute value of said power supply means through said output terminals of said second static switch means when not actuated to the ON state, said first static switch means of said static controller means providing substantially an electrically conducting path across said capacitive element when said first static switch means is in the ON state, thus providing a current path for electrical current flowing through the control terminal of said second static switch, and keeping the second static switch in the ON state so that the control terminal of said third static switch is substantially connected to the previously mentioned terminal of said power supply means normally keeping said third static switch in the off state and preventing the previously mentioned flow of energy to said relay means, when said first static switch means is placed in the OFF state, said capacitive element is charged by current flowing through said resistive element and said control terminal of said second static switch at a rate sufficient to charge the capacitive element to a voltage value capable of changing the state of said second static switch from on to off so that the control terminal of said third static switch is then substantially not connected to said corresponding mentioned terminal of said power supply means thus turning said third static switch on to thereby allow energy to flow to said relay means, said timer means being actuated by said first static switch once per cycle of said carrier signal but only providing a signal to energize said relay when said portion of said carrier modulating beat frequency signal has passed through said predetermined level of amplitude and remained there for a predetermined time.

19. The combination as claimed in claim 18 wherein said seal in means comprises a first static device having a control terminal and first and second output terminals thereon, said control terminal being connected to said terminal on said relay means having said higher absolute value of voltage present thereon when said relay coil is energized, said first and second output terminals of said first static device being connected in parallel circuit relationship with said first pair of output terminals on said input transformer means and with said static controller means so that a portion of said unfiltered carrier signal is shunted away from said control terminal of said first static switch means of said static controller means in response to said application of said output signal at said output terminals of said static relay coil driver at said relay means for the purpose of temporarily changing said portion of said beat frequency signal supplied to said static controller means to thereby delay deenergization of said relay coil so that after said relay means is actuated for the purpose of actuating said circuit interrupter to cause connection of said generator means to said electric network, whereby said relay coil will remain energized until said voltage and frequency of said at least one phase of said generator is substantially equal to said voltage and frequency of said at least one corresponding phase of said electric network and said connection will be made with a minimum internal readjustment of voltage and frequency values between said generator and said electric network.

20. The combination as claimed in claim 19 wherein said bias supply means comprises a half wave rectifier connected in series circuit relationship with a voltage divider means, the later series combination being connected across said second pair of output terminals of said input transformer means to thereby energize said bias supply means, said voltage divider means having an intermediate output terminal connected in circuit relationship to said control terminal of said first static switch means of said static controller means, electric current flowing between said voltage divider output terminal and said first static switch means control terminal providing a bias signal to said control terminal of said static controller to provide said predetermined level of amplitude for said beat frequency signal.

21. The combination as claimed in claim 18 wherein said bias supply means comprises a half wave rectifier connected in series circuit relationship with a voltage divider means, the later series combination being connected across said second pair of output terminals of said input transformer means to thereby energize said bias supply means, said voltage divider means having an intermediate output terminal connected in current relationship to said control terminal of said first static switch means of said static controller means, the electric current which flows between said voltage divider output terminal and said first static switch means control terminal providing a bias signal to said control terminal of said static controller to provide said predetermined level of amplitude for said beat frequency signal.

22. The combination as claimed in claim 1 wherein seal in means comprises a first static device having a control terminal and first and second output terminals thereon, said control terminal being connected to said terminal on said relay means having said higher absolute value of voltage present thereon when said relay coil is energized, said first and second output terminals of said first static device being connected in parallel circuit relationship with said first pair of output terminals on said input transformer means and with said static controller means such that a portion of said unfiltered carrier signal is shunted away from said control terminal of said first static switch means of said static controller means in response to said application of said output signal at said output terminals of said static relay coil driver at said relay means for the purpose of temporarily changing said portion of said beat frequency signal supplied to said static controller means to delay deenergization of said relay coil so that after said relay means is actuated for the purpose of actuating said circuit interrupter to cause connection of said generator means to said electric network, said relay coil will thereby remain energized until said voltage and frequency of said at least one phase of said generator is substantially equal to said voltage and frequency of said at least one corresponding phase of said electric network so that said connection will be made with a minimum internal readjustment of voltage and frequency values between said generator and said electric network.

23. The combination as claimed in claim 22 wherein said bias supply means comprises a half wave rectifier connected in series circuit relationship with a voltage divider means, the later series combination being connected across said second pair of output terminals of said input transformer means to thereby energize said bias supply means, said voltage divider means having an intermediate output terminal connected in circuit relationship to said control terminal of said first static switch means of said static controller means, the electric current which flows between said voltage divider output terminal and said first static switch means control terminal providing a bias signal to said control terminal of said static controller to provide said predetermined level of amplitude for said beat frequency signal.

24. The combination claimed in claim 1 wherein said bias supply means comprises a half wave rectifier connected in series circuit relationship with a voltage divider means, the later series combination being connected across said second pair of output terminals of said input transformer means to thereby energize said bias supply means, said voltage divider means having an intermediate output terminal connected in circuit relationship with said control terminal of said first static switch means of said static controller means, the electric current which flows between said voltage divider output terminal and said first static switch means control terminal providing a bias signal to said control terminal of said static controller to provide said predetermined level of amplitude for said beat frequency signal.

* * * * *